(12) United States Patent
Rioux

(10) Patent No.: US 7,464,513 B2
(45) Date of Patent: Dec. 16, 2008

(54) MODULAR TOWER STRUCTURE

(75) Inventor: Andre Rioux, Longueuil (CA)

(73) Assignee: Tower Solutions Inc., Ontario (CA)

( * ) Notice: Subject to any disclaimer, the term of this patent is extended or adjusted under 35 U.S.C. 154(b) by 770 days.

(21) Appl. No.: 10/814,234

(22) Filed: Apr. 1, 2004

(65) Prior Publication Data

US 2004/0211149 A1   Oct. 28, 2004

(30) Foreign Application Priority Data

Apr. 4, 2003   (CA)   .................................. 2424599

(51) Int. Cl.
*E03H 12/00*   (2006.01)

(52) U.S. Cl. .............. 52/651.01; 52/651.02; 52/651.07; 52/651.1; 52/651.11; 52/653.1; 52/654.1; 52/655.1

(58) Field of Classification Search ............. 52/651.01, 52/651.02, 651.03, 651.04, 651.05–651.09, 52/652.1, 653.1, 654.1, 651.1, 651.11, 655.1, 52/146–152; 248/121, 126
See application file for complete search history.

(56) References Cited

U.S. PATENT DOCUMENTS

| | | | | |
|---|---|---|---|---|
| 835,279 | A * | 11/1906 | Haskell ..................... | 52/651.02 |
| 2,611,933 | A * | 9/1952 | Comfort ...................... | 52/207 |
| 2,738,039 | A * | 3/1956 | Hamilton .................... | 52/2.22 |
| 2,795,303 | A * | 6/1957 | Muehlhause et al. .......... | 52/121 |
| 3,373,473 | A * | 3/1968 | Keslin ..................... | 29/897.33 |
| 3,565,210 | A * | 2/1971 | Evans .......................... | 182/106 |
| 3,571,991 | A * | 3/1971 | Doocy et al. .................... | 52/40 |
| 4,934,114 | A * | 6/1990 | Lindsey .......................... | 52/40 |
| 5,119,613 | A * | 6/1992 | Atkinson et al. ............... | 52/646 |
| 5,537,125 | A * | 7/1996 | Harrell et al. ................ | 343/878 |
| 5,553,978 | A * | 9/1996 | Bates .......................... | 405/244 |
| 5,588,274 | A * | 12/1996 | Lange ........................ | 52/653.1 |
| 5,706,622 | A * | 1/1998 | Lange ........................ | 52/653.1 |
| 5,743,060 | A * | 4/1998 | Hayes et al. ................ | 52/648.1 |
| 5,832,688 | A * | 11/1998 | Crissey et al. ............ | 52/651.01 |
| 6,105,794 | A | 8/2000 | Bauer | |
| 6,250,025 | B1 * | 6/2001 | Darby .......................... | 52/137 |
| 6,615,562 | B2 * | 9/2003 | Fritsche et al. ................ | 52/696 |
| D497,498 | S * | 10/2004 | Berg et al. .................... | D6/491 |
| 2002/0084142 | A1* | 7/2002 | Brennan et al. ............. | 182/133 |

FOREIGN PATENT DOCUMENTS

| | | |
|---|---|---|
| DE | 7046897.2 | 3/1971 |
| EP | 0389214 A | 9/1990 |
| GB | 560858 A | 4/1944 |

* cited by examiner

*Primary Examiner*—Jeanette Chapman
(74) *Attorney, Agent, or Firm*—Manelli Denison & Selter; Edward J. Stemberger

(57) ABSTRACT

A fitting is provided for use in retaining a plurality of accessory members to a vertical modular structural unit of a telecommunications tower or electricity pylon. The unit has a plurality of vertical sides wherein each side has at least one side aperture. The fitting has a body; a body plate attached to the body and so-shaped as to be cooperable with a side of the unit and receivable in intimate engagement within the side aperture; attachments by which the fitting is attachable to the structure and the body plate is retained thereto receivable within the side aperture by retaining bolts; the body having at least one accessory, such as a guy rope, insulator, dish and platform-receiving aperture for retaining the accessory to the body. The shape of the apertures in each unit side which is complimentary with the body plate, provides a lighter, stronger and more efficacious modular unit and tower.

15 Claims, 5 Drawing Sheets

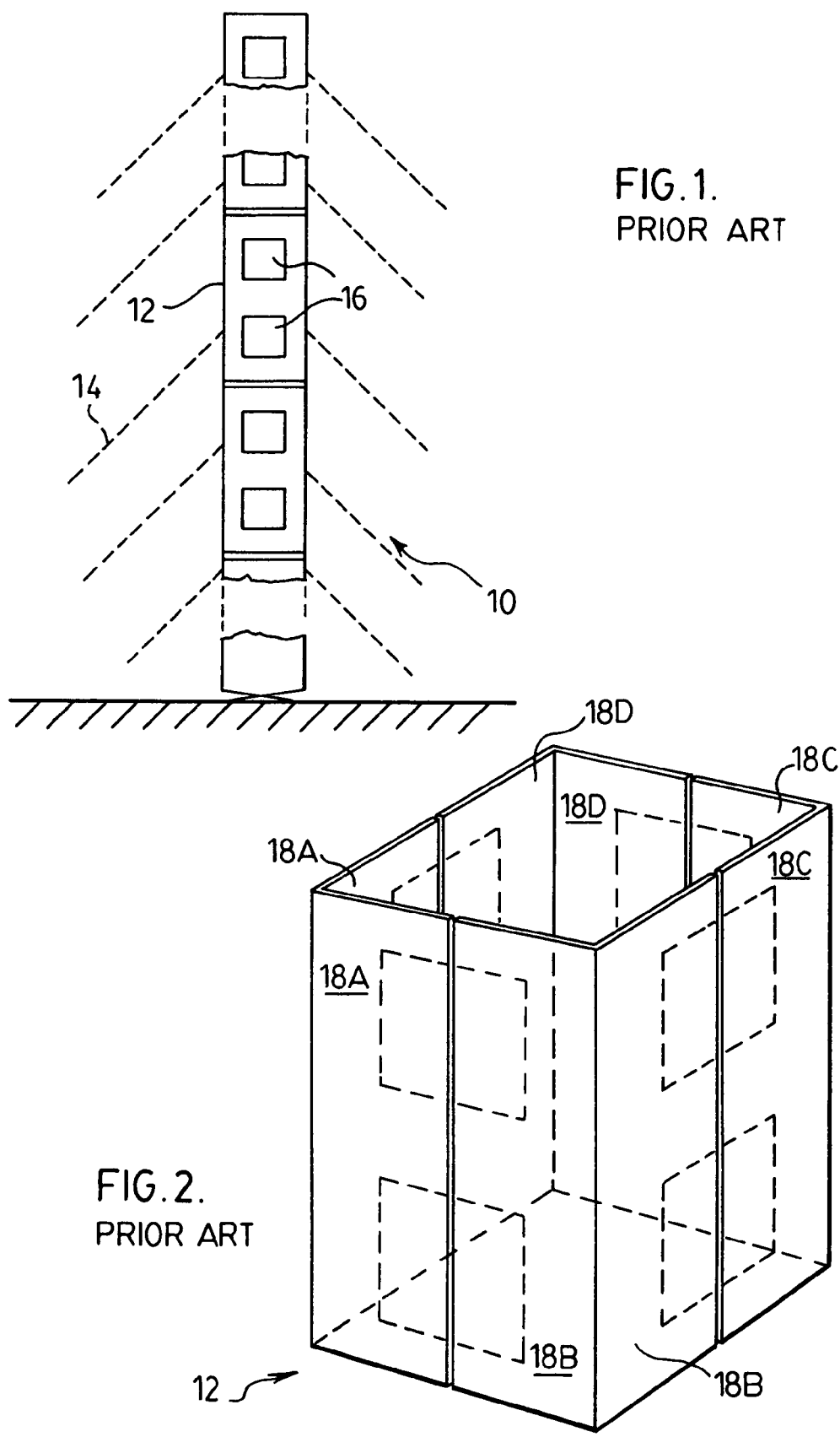

MODULAR TOWER STRUCTURE

FIELD OF THE INVENTION

This invention relates to fittings connectable to modular units for use in telecommunication towers, electricity pylons, and like structures; said modular units; and said structures.

BACKGROUND OF THE INVENTION

Conventional towers, pylons, and the like, for carrying cables for electrical transmission across the country have, typically, splayed or parallel legs with relatively large footprints and have connecting cross-members, formed of steel members. Such structures are heavy and take a relatively long time to erect, repair and the like. Replacement in whole, or in part, can take significant amounts of time. In an emergency, when a plurality of such towers are structurally damaged or the cables thereon snapped by the effect of ice build-up due to, e.g. freezing rain, this can cause very serious disruption to the transmission of electricity, throughout a community or larger area.

Recently, alternative tower structures have been introduced as temporary or permanent replacements of the aforesaid steel towers, which replacement towers are formed of aluminum, have a smaller footprint and are faster and easier to erect on site than aforesaid steel towers. These towers are provided in hollow, modular form and are erected from hollow modular units, generally, on site, by the bolting of one modular unit to another unit to the desired height.

Each of the modular units are essentially rectangular in shape and, generally, formed by the welding of four identical angled panels at adjoining vertical edges to form a box of desired height, breadth and width, typically, 2.5 m×41 cm×41 cm. Relatively large apertures are provided in each of the aluminum sides to offer savings in material and weight while allowing of wind passage.

Such towers have been found to be most structurally sound, lightweight and extremely fast to erect as to offer significant beneficial emergency situation remedial units.

The full tower may be assembled on the ground and raised by means of a crane or helicopter, or built piecemeal in the air by means of a Jim pole assembly technique, to the desired height.

However, there remains a need of the aforesaid aluminum modular tower to minimize on the amount of material used, while improving on the structural strength of the tower.

SUMMARY OF THE INVENTION

It is an object of the present invention to provide a modular tower for use as a permanent, temporary, or emergency fixture, for carrying electricity cables, communication equipment, cables or the like, which is structurally stronger on a per weight basis than prior art modular towers.

Accordingly, in one aspect the invention provides a modular tower structure for carrying electricity transmission cables, communication equipment and the like, comprising a plurality of rectangular aluminum modular units fixed one to another in vertical alignment, wherein each modular unit has a height, width, breadth and sides, said sides having a plurality of apertures, the improvement wherein said width and breadth are essentially equal and of 46±1 cm, and the length is selected from 2.0-2.5 m.

In a further aspect, the invention provides a fitting for use in retaining a plurality of accessory members to a vertical structural unit which unit has a plurality of vertical sides wherein each side has a portion defining a side aperture; said fitting comprising a
 (i) body;
 (ii) a body plate member attached to said body and so-shaped as to be cooperable with a said side of said structure and receivable in intimate engagement within said side aperture;
 (iii) attachment means by which said fitting is attachable to said structure and said body plate member is retained thereto within said aperture by retaining means; and
 (iv) said body having a portion defining at least one accessory receiving means adapted to retain said accessory member to said body.

The fitting as hereinabove defined preferably has said body plate member so-shaped as to be so receivable within said side aperture of said structural unit, and wherein said side aperture has an essentially circular shape, and has a plurality of inwardly protruding side portions, and wherein each of said side portions defines a bolt-receiving aperture.

Most preferably the side aperture has a shape defined as an extended oval having a vertical axis length greater than its horizontal, axis length, when the unit is constructed in the tower, pylon or like structure, and having four inwardly-protruding symmetrically opposed portions.

Preferably, the plate member is integrally formed with the body.

The attachment means, preferably, comprises a bolt- or shackle-receiving aperture defined by a portion of the body or plate member adapted to receive a bolt or shackle attached to an accessory member selected, for example, from the group consisting of a guy rope, electrical insulator, disk, platform or like member of use in the tower structure field.

The fitting as hereinabove defined preferably, has a plurality of protruding members.

In preferred embodiments, the fitting as hereinabove defined has the body comprising
 (a) a first protruding plate having a portion defining a first plate aperture;
 (b) a first horizontally protruding plate and a second horizontally protruding plate parallel to and at a distance from said first horizontal protruding plate to define an interplate open channel; and wherein (i) said first horizontal protruding plate has a plurality of portions defining a plurality of apertures, (ii) said second horizontal protruding plate has a portion defining at least one aperture, and a proximal first side wing having a portion defining a first wing aperture and a distant second side wing having a portion defining a second wing aperture; and
 (c) an interplate-strengthening portion between said first and second horizontally protruding plates.

Most preferably the fitting as hereinabove defined in the context of when it is attached to the structure, comprises
 (i) said first protruding plate is a vertically protruding upper plate;
 (ii) said first horizontally protruding plate is below said vertically protruding plate, and above said second horizontally protruding plate; and
 (iii) said proximal and distal wings are downwardly pointing.

The fittings as hereinabove defined are most preferably of a unitary, integrally-formed construction.

The body, preferably, further comprises a fitting wherein the body further comprises a vertical plate member having a portion defining a vertical plate member aperture below the second horizontal plate.

The fittings as hereinabove defined are thus adapted to receive in suitable engagement at least one and, most preferably, a plurality of aforesaid accessories. Suitable selection of the accessory may provide for vertical, horizontal or other planes of rotation of the accessory relative to the fitting according to the invention when the accessory is connected to the fitting.

In a further aspect, the invention provides a modular unit for use with a fitting as hereinabove defined and in a tower construction comprising a four-sided rectangular box-like structure wherein each side has portions defining at least one side aperture, wherein the aperture has an essentially circular shape and has a plurality of inwardly protruding side portions and wherein each of the side portions define a bolt receiving aperture.

The modular unit hereinabove defined most preferably has the side apertures having a shape defined as an extended oval having a vertical axis greater than its horizontal axis as viewed when constructed as a full tower and having four inwardly protruding symmetrically opposed side portions, and wherein said each of said side portions define a bolt-receiving aperture.

The unit most preferably has a width of 46±1 cm, a breadth of 46±1 cm and a length (height) selected from 2.0-2.5 cm.

Further most preferably the modular unit has a pair of apertures as hereinabove defined in each side.

In a further aspect the invention provides a telecommunications tower, electricity pylon or like structure comprising
(i) a plurality of modular units as hereinabove defined;
(ii) a plurality of fittings as hereinabove defined, retained to said modular units; and
(iii) accessory members selected from the group consisting of guy ropes, insulators, dishes and platforms connected to said fittings.

Most preferably, the invention provides a telecommunications tower, electrical pylon or like structure comprising a plurality of modular unit assemblies as hereinabove defined wherein each of said side apertures has the form of an extended oval having a vertical axis length greater than its horizontal axis length and having four inwardly protruding symmetrically opposed portions.

Most preferred modular units and fittings are formed of aluminum.

I have found that by restricting the structural dimensions to those hereinabove defined, that a 20% increase in structural strength is obtained over the nearest prior art commercial structures.

Further, that by preferably providing each modular unit with a pair of apertures, preferably, of an elongated scallop or completed elongated horseshoe arched shape, as hereinabove alternatively described, the total weight of the tower is less than a comparable prior art tower, notwithstanding the increase in width and breadth of the modular unit according to the invention. The completed elongated horseshoe arch is formed from a pair of segmented shape having a central arc extending through more than a semi-circle, and two identical, reversed, side arcs each spanning less than a quarter circle.

The invention, thus, provides an improved attachment, preferably, of unitary construction for retaining aforesaid accessories. It provides an improved metal fitting which offers a swivel mechanism with the tower framework, the insulator head and the guy wire, which in preferred embodiments permits circular planar movement in both the vertical and horizontal planes.

Any vibration or gallop of the conductor is not transferred to the tower because of the innovative "free movement" design of the hardware attachment for the insulator. The same design is used for the guy wire attachment.

BRIEF DESCRIPTION OF THE DRAWINGS

In order that the invention may be better understood, a preferred embodiment will now be described by way of example only, with reference to the accompanying drawings wherein FIG. 1 is a diagrammatic vertical view of a tower structure according to the prior art;

FIG. 2 is a diagrammatic isometric view of a pre-fabricated module according to the prior art for use in a tower structure shown in FIG. 1;

and wherein the same numerals denote like parts.

DETAILED DESCRIPTION OF PREFERRED EMBODIMENT

Figure 3:
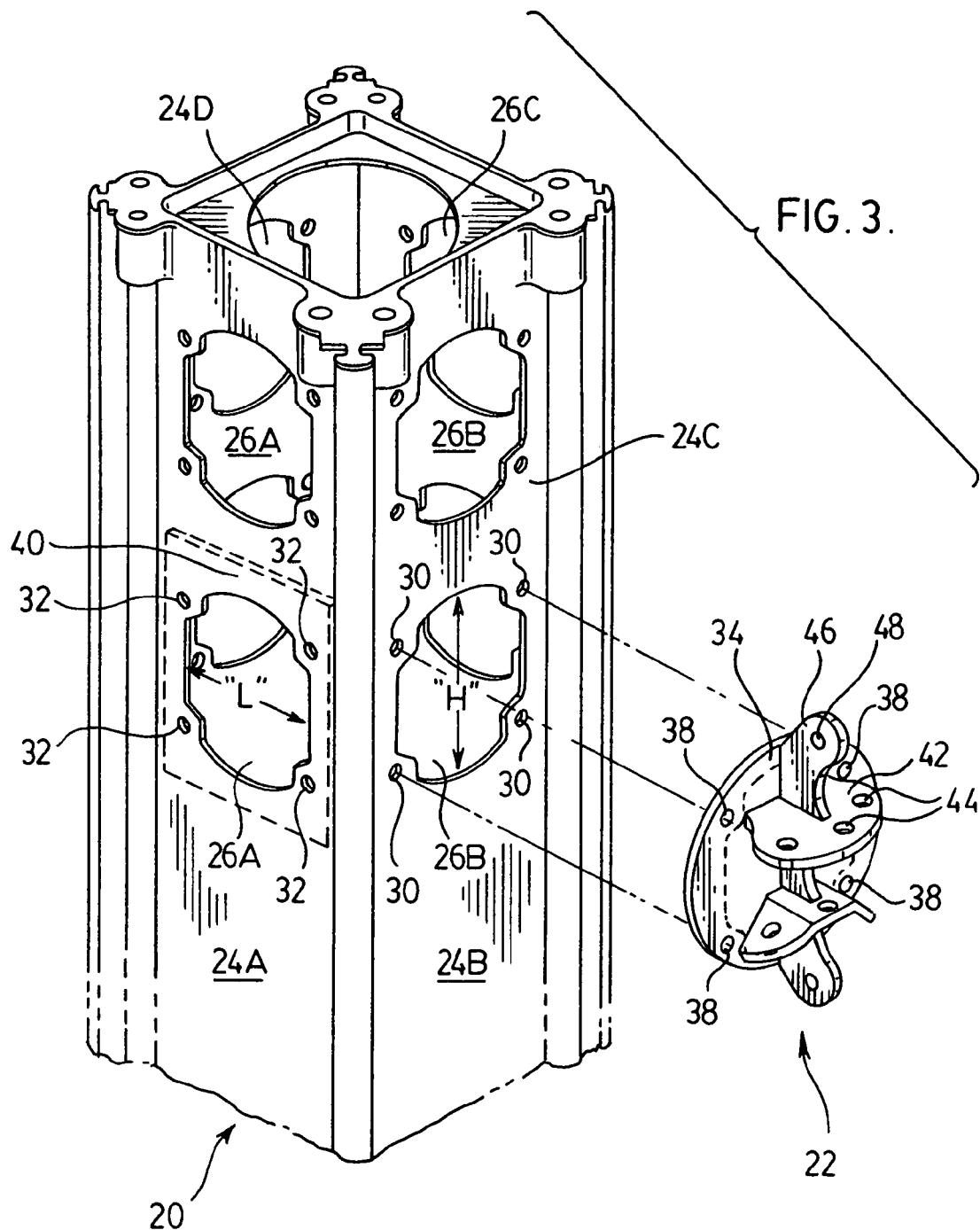
FIG. 3 is a diagrammatic isometric view of a modular unit and fitting according to the invention prior to assembly.
Figure 4:
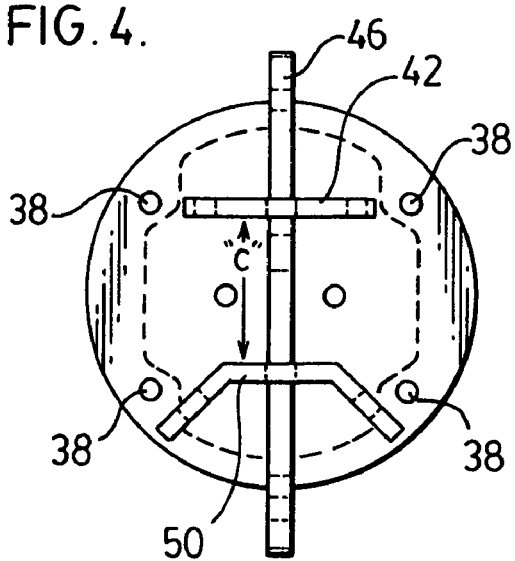
FIG. 4 is a diagrammatic front view of the fitting shown in FIG. 3.
Figure 5:
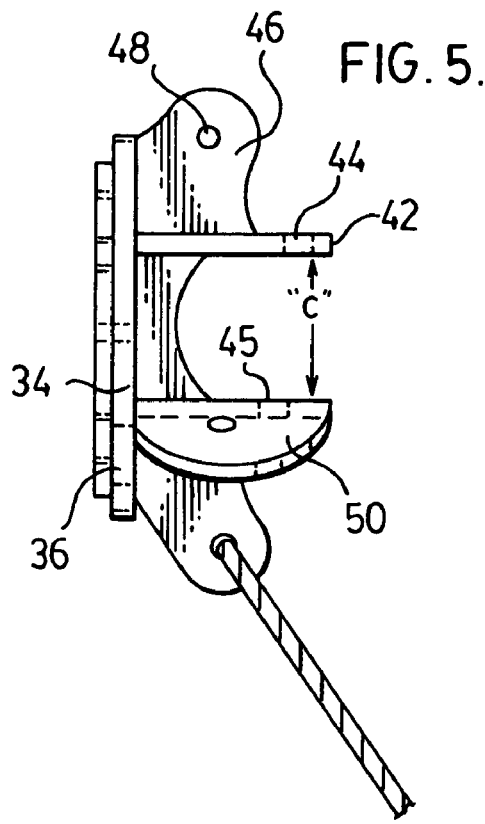
FIG. 5 is a diagrammatic side view of the fitting shown in FIG. 3.
Figure 6:
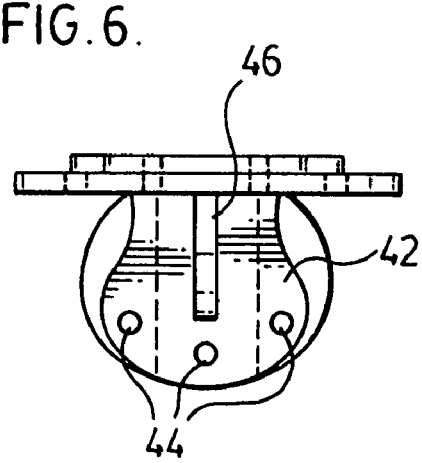
FIG. 6 is a diagrammatic top view of the fitting shown in FIG. 3.
Figure 7:
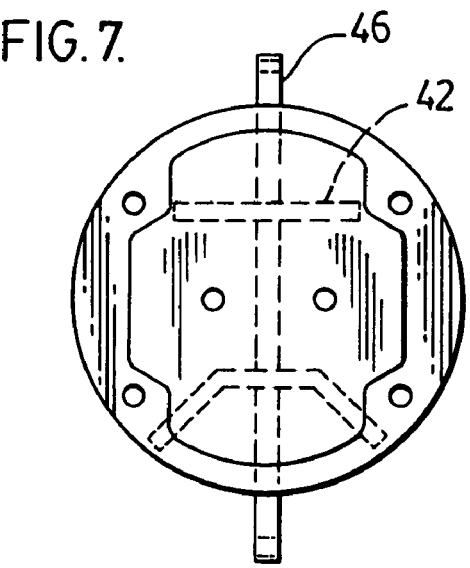
FIG. 7 is a diagrammatic rear view of the fitting shown in FIG. 3.
Figure 8:
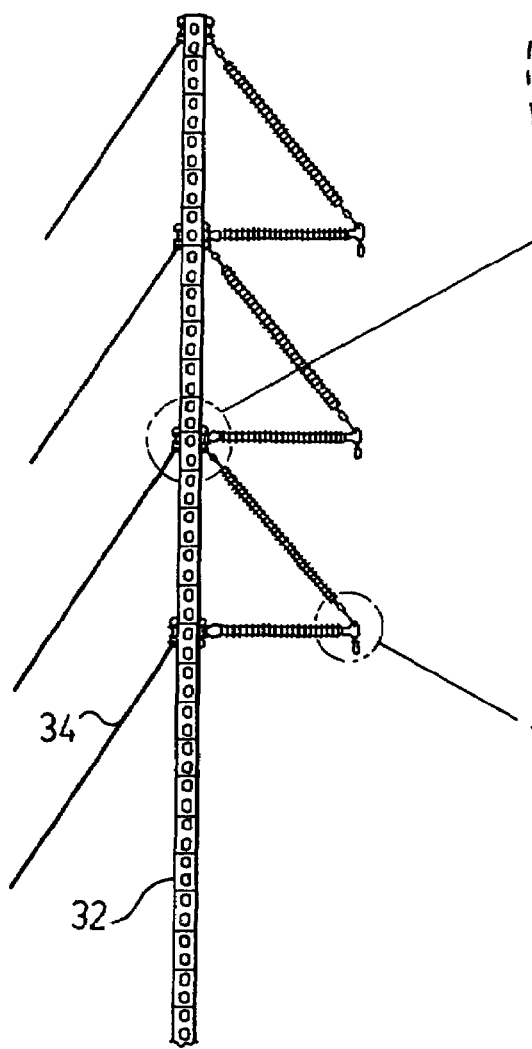
FIG. 8A is a diagrammatic vertical cross-section view of a section of a tower structure according to the invention with FIG. 8B being an enlargement thereof, in cooperation with fittings according to the invention.
Figure 8B:
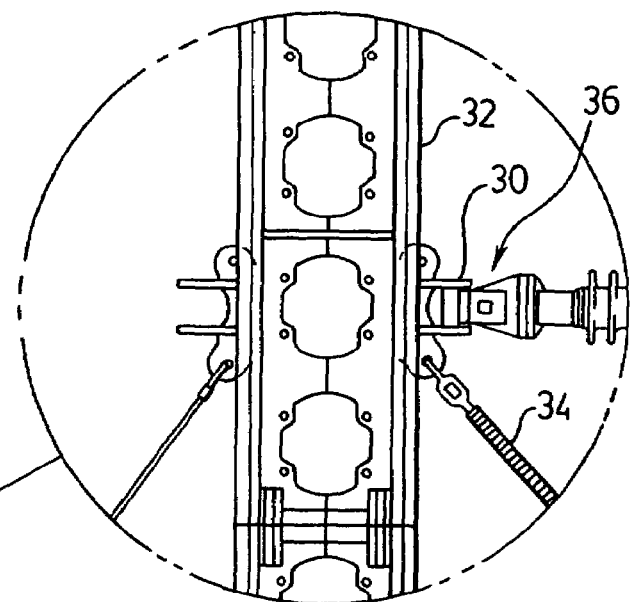
Figure 8A:
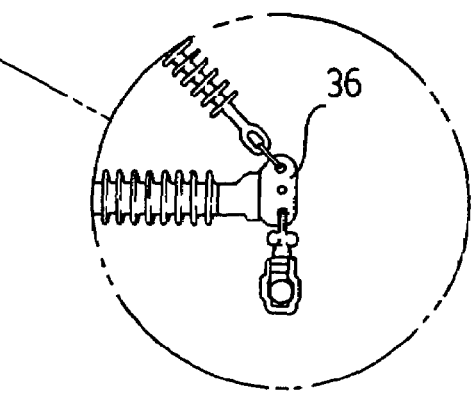

With reference to FIG. 1, this shows generally as 10 a tower formed of a plurality of aluminum modular units 12 shown in more detail with reference to FIG. 2.

The tower may have at least two and preferably ten modules bolted together to a desired height and is retained by guy ropes 14 to the ground by fittings (not shown). Each module 12 has a plurality of apertures 16 on each of its four sides.

With reference to FIG. 2, prior to welding assembly module 12 to another module 12 during construction of tower 10, each module 12 is constructed from four identical angled panels, having sides 18A, 18B, 18C and 18D, by welding to form an essentially rectangular box of equal width and breadth but of a longer length (height). Apertures 16 shown in ghost lines are subsequently cut out of each of the panel sides 18A-18D. Typically, this prior art module 12 has a width and breadth of 41 cm and a length of height 2.0-2.5 m.

FIG. 3 shows generally as 20 an aluminum rectangular, box-like modular unit according to the invention, fixtoposed to an aluminum fitting 22 according to the invention, prior to assembly.

Unit 20 has four sides 24A, 24B, 24C and 24D of a width and breadth of 46±1 cm. and a height of 2.25 m. Each side has a pair of side apertures 26A, 26B, 26C and 26D, respectively, essentially mid-centre of each side one above another. Each corner of unit 20 has a solid support unit 28.

Each side aperture, 26A-26D, takes the form of an extended oval having its central vertical axis length "H" greater than its central horizontal axis length "L" and four inwardly protruding symmetrically opposed portions 30, each portion 30 having a bolt-receiving aperture 32. Each aperture is also shown in FIG. 3A.

The ratio of lengths "H" to "L" may vary from as low as 1:1, but is preferably in the range 1.2-1.4:1.

With reference to FIGS. 4-7, fitting 22 is of an integral structure having a circular planar body 34 and a body plate member 36. Plate member 36 protrudes from body 34 horizontally when unit 22 is viewed as being vertical when fitted into tower module unit 20. In this description, directions are used relative to this position of the fitting, best seen in FIG. 5. Plate member 36 is so-shaped as to be complimentary to an aperture 26A-26B as to be received in intimate engagement therein.

Body 34 has four bolt-receiving apertures 38 so located as to align with apertures 32 by which fitting 22 is bolted to modular unit 20. In an alternative preferred embodiment, fitting 22 and unit 20 are connected by bolts through a backing plate 40 to dispense structural strain on unit 20.

Body 34 on its opposite side to plate member 36 has a protruding horizontal disc-like planer plate member 42 having a plurality of bolt- or shackle-receiving apertures 44, three in the embodiments shown.

Above member 44 is a vertically aligned planar member 46 having a bolt- or shackle-receiving aperture 48.

Below planar member 42 is a further horizontally protruding essentially disc-like plate member 50, parallel to at a distance from member 44 as to define therebetween an interpolate open channel "C". Member 44 has a pair of downwardly extending wings 52, 54 wherein each of proximal wing 52 and distal wing 54 have a bolt- or shackle-receiving aperture 56, 58, respectively.

Body 34 has an interplate strengthening portion 60 within channel "C".

Figure 9:
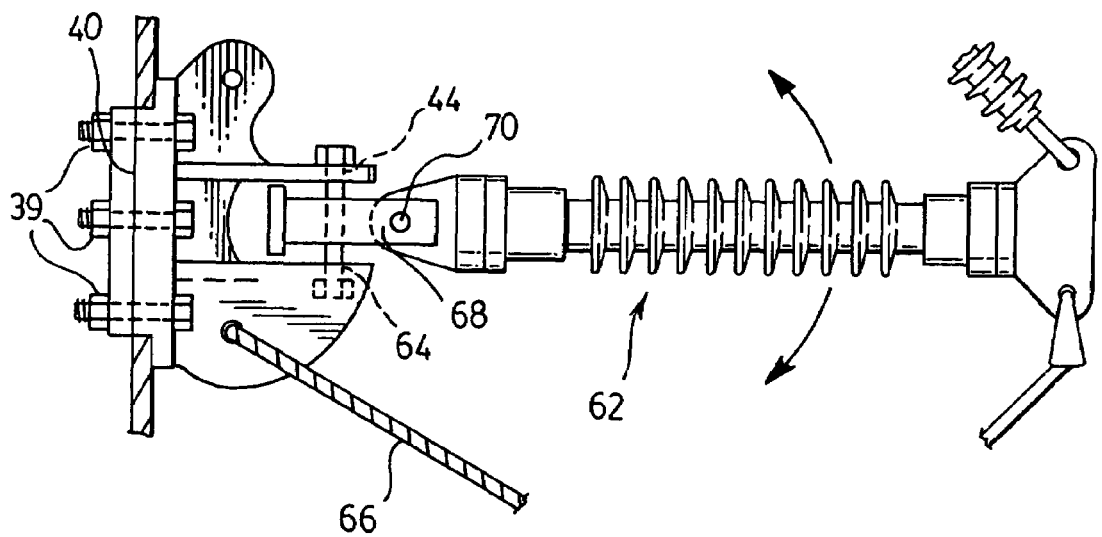
FIG. 9 shows a shackled insulator assembly fitted to a unit by a bolt.
Figure 10:
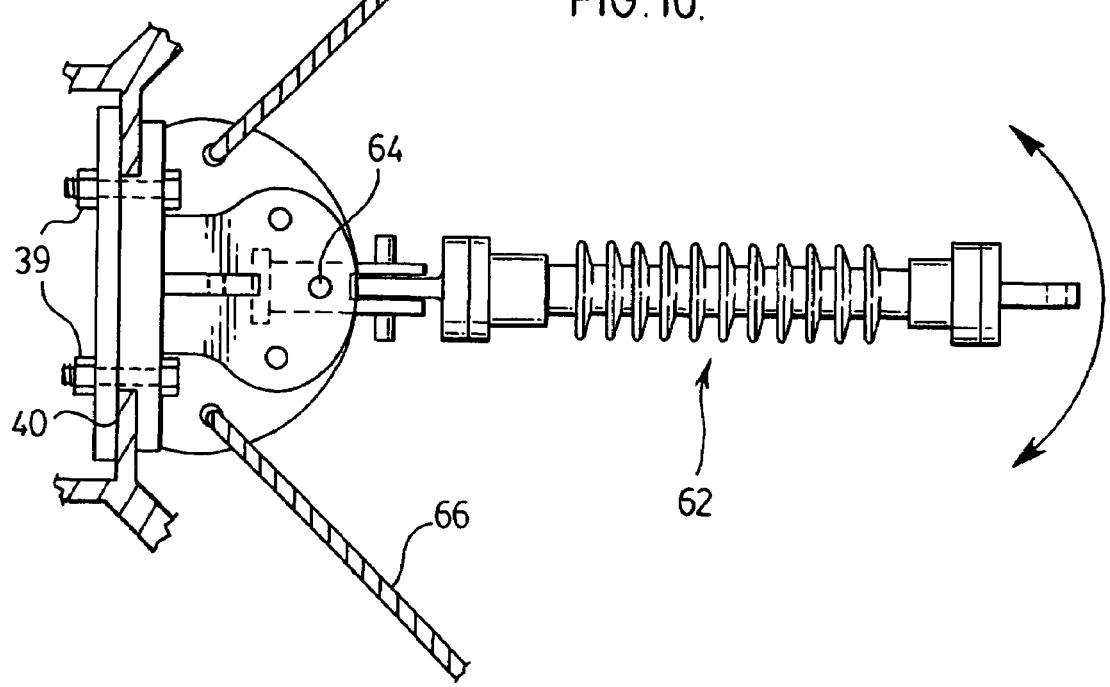
FIG. 10 is a top view of the assembly of FIG. 9.

FIGS. 9 and 10 show as a shackled insulator assembly generally as 62 fitted to unit 22 by bolt 64 through opposing apertures 44 of upper plate 42 and aperture 45 of lower plate 50. A guy rope 66 is shown attached to fitting 22. Shackle member 68 allows of both vertical rotational movement of insulator 62 (FIG. 9) around bolt 70 and horizontal rotational movement around bolt 64.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

The invention claimed is:

1. A fitting constructed and arranged to retain a plurality of accessory members to a vertical structural unit which unit has a plurality of vertical sides wherein each side has a portion defining a side aperture; said fitting comprising
   (i) a body;
   (ii) a body plate member attached to said body and constructed and arranged to be cooperable with a said side of said structural unit and receivable in intimate engagement within said side aperture, the body plate member being of a size smaller than the body so that only the body plate member can be received in said side aperture;
   (iii) attachment means constructed and arranged to attached said fitting to said structural unit with said body plate member received within side aperture; and
   said body having a portion defining at least one accessory-receiving means constructed and arranged to retain said accessory member to said body,
   the fitting being in combination with said structural unit, wherein said body plate member is received within said side aperture of said structural unit, and wherein said side aperture has an essentially circular shape, and has a plurality of inwardly protruding side portions, and wherein each of said side portions defines a bolt-receiving aperture.

2. A combination as defined in claim 1 wherein said side aperture has a shape defined as an extended oval having a vertical axis length greater than its horizontal axis, and having four inwardly protruding symmetrically-opposed portions.

3. A combination as defined in claim 1 wherein said plate member is integrally formed with said body.

4. A fitting constructed and arranged to retain a plurality of accessory members to a vertical structural unit which unit has a plurality of vertical sides wherein each side has a portion defining a side aperture; said fitting comprising
   (iv) a body;
   (v) a body plate member attached to said body and constructed and arranged to be cooperable with a said side of said structural unit and receivable in intimate engagement within said side aperture, the body plate member being of a size smaller than the body so that only the body plate member can be received in said side aperture;
   (vi) attachment means constructed and arranged to attached said fitting to said structural unit with said body plate member received within side aperture; and
   said body having a portion defining at least one accessory-receiving means constructed and arranged to retain said accessory member to said body,
   wherein said attachment means comprises a plurality of bolt-receiving apertures defined by portions of said body or said plate member, operably alignable with said bolt-receiving apertures of said side portion.

5. A fitting as defined in claim 4 wherein said body has at least one protruding member having a portion defining an accessory bolt-receiving aperture.

6. A fitting constructed and arranged to retain a plurality of accessory members to a vertical structural unit which unit has a plurality of vertical sides wherein each side has a portion defining a side aperture; said fitting comprising
   (vii) a body;
   (viii) a body plate member attached to said body and constructed and arranged to be cooperable with a said side of said structural unit and receivable in intimate engagement within said side aperture, the body plate member being of a size smaller than the body so that only the body plate member can be received in said side aperture;
   (ix) attachment means constructed and arranged to attached said fitting to
   said structural unit with said body plate member received within side aperture; and
   said body having a portion defining at least one accessory-receiving means constructed and arranged to retain said accessory member to said body,
   wherein said body has a plurality of said protruding members each having a portion defining an accessory bolt-receiving aperture.

7. A fitting constructed and arranged to retain a plurality of accessory members to a vertical structural unit which unit has a plurality of vertical sides wherein each side has a portion defining a side aperture; said fitting comprising
   (x) a body;
   (xi) a body plate member attached to said body and constructed and arranged to be cooperable with a said side of said structural unit and receivable in intimate engagement within said side aperture, the body plate member being of a size smaller than the body so that only the body plate member can be received in said side aperture;

(xii) attachment means constructed and arranged to attached said fitting to said structural unit with said body plate member received within side aperture; and said body having a portion defining at least one accessory-receiving means constructed and arranged to retain said accessory member to said body, wherein said body comprises (a) a first protruding plate having a portion defining a first plate aperture;

(b) when said fitting is operably retained to said structure, a first horizontally protruding plate and a second horizontally protruding plate parallel to and at a distance from said first horizontal protruding plate to define an interplate open channel; and wherein (i) said first horizontal protruding plate has a plurality of portions defining a plurality of apertures, and (ii) said second horizontal protruding plate has a portion defining at least one aperture, a proximal first side wing having a portion defining a first wing aperture and a distal second side wing having a portion defining a second wing aperture; and (c) an interplate strengthening portion between said first and second horizontally protruding plates.

8. A fitting as defined in claim 7 wherein when said fitting is operably attached to said structure, (i) said first protruding plate is a vertically protruding upper plate;

(ii) said first horizontally protruding plate is below said vertically protruding plate and above said second horizontally protruding plate; and (iii) said proximal and distal wings are downwardly pointing.

9. A fitting as defined in claim 8 wherein said body further comprises a lower vertical plate member having a portion defining a vertical plate member aperture below said second horizontal plate.

10. A fitting as defined in claim 4 of a unitary, integral form.

11. A fitting constructed and arranged to retain a plurality of accessory members to a vertical structural unit which unit has a plurality of vertical sides wherein each side has a portion defining a side aperture; said fitting comprising (xiii) a body;

(xiv) a body plate member attached to said body and constructed and arranged to be cooperable with a said side of said structural unit and receivable in intimate engagement within said side aperture, the body plate member being of a size smaller than the body so that only the body plate member can be received in said side aperture;

(xv) attachment means constructed and arranged to attached said fitting to said structural unit with said body plate member received within side aperture; and said body having a portion defining at least one accessory-receiving means constructed and arranged to retain said accessory member to said body, wherein the fitting is adapted to receive in fitting engagement by at least one of said apertures at least one accessory selected from the group consisting of a guy rope, electrical insulator, dish and platform.

12. A tower structure comprising (i) a plurality of modular units, each unit comprising a four-sided rectangular box-like structure wherein each side has portions defining at least one side aperture with side portions protruding into the aperture, and each of said side portions defining a fastener-receiving aperture;

(ii) a plurality of fittings retained to said modular units, each fitting comprising a body;

a body plate member attached to said body and received in intimate engagement within said side aperture, attachment means cooperable with the fastener-receiving means to permit attaching of said fitting to said unit with said body plate member received within side aperture; and said body having a portion defining at least one accessory-receiving means constructed and arranged to retain said accessory member to said body; and (iii) accessory members selected from the group consisting of guy ropes, insulators, dishes and platforms connected to said accessory-receiving means.

13. A structure as defined in claim 12 wherein said side aperture has a shape defined as an extended oval having a vertical axis length greater than its horizontal axis, and having four inwardly protruding symmetrically-opposed side portions.

14. A structure as defined in claim 12 wherein said plate member is integrally formed with said body.

15. A structure as defined in claim 12 wherein said body comprises (a) a first protruding plate having a portion defining a first plate aperture;

(b) when said fitting is operably retained to said structure, a first horizontally protruding plate and a second horizontally protruding plate parallel to and at a distance from said first horizontal protruding plate to define an interplate open channel; and wherein (i) said first horizontal protruding plate has a plurality of portions defining a plurality of apertures, and (ii) said second horizontal protruding plate has a portion defining at least one aperture, a proximal first side wing having a portion defining a first wing aperture and a distal second side wing having a portion defining a second wing aperture; and (c) an interplate strengthening portion between said first and second horizontally protruding plates.

\* \* \* \* \*